(12) United States Patent
Andrus et al.

(10) Patent No.: US 6,807,437 B1
(45) Date of Patent: Oct. 19, 2004

(54) WIRELESS COMMUNICATION APPARATUS FOR PORTABLE ELECTRONIC DEVICES

(75) Inventors: David C. Andrus, Provo, UT (US); Matthew Scott Martin, Pleasant Grove, UT (US); Kurt Stewart, Lehi, UT (US)

(73) Assignee: 3com Corporation, Santa Clara, CA (US)

( * ) Notice: Subject to any disclaimer, the term of this patent is extended or adjusted under 35 U.S.C. 154(b) by 416 days.

(21) Appl. No.: 09/775,022

(22) Filed: Jan. 31, 2001

(51) Int. Cl.[7] ................................................ H04B 1/38

(52) U.S. Cl. ................................... 455/575.7; 343/702

(58) Field of Search ........................ 455/575.7, 556.1, 455/556.2, 557, 550.1, 575.3; 343/702

(56) References Cited

U.S. PATENT DOCUMENTS 5,905,467 A * 5/1999 Narayanaswamy et al. . 343/702

* cited by examiner

Primary Examiner—Lee Nguyen

(57) ABSTRACT

An apparatus and system for providing wireless communication for a portable computer system. In one embodiment, the present invention is a wireless communication apparatus. The wireless communication apparatus is adapted to be communicatively coupled to a portable computer system. In the present embodiment, the apparatus is comprised of a PCB (printed circuit board). It is noted that the PCB of the present invention is separate from and in addition to the PCB of the portable computer system to which it is coupled. The apparatus is further comprised of an antenna, coupled to the PCB adapted to transceive a specific radio frequency band. The apparatus is further comprised of a passive radiator coupled to the PCB. The passive radiator is adapted to provide an omindirectional radiation pattern for the wireless communication apparatus.

19 Claims, 13 Drawing Sheets

WIRELESS COMMUNICATION APPARATUS FOR PORTABLE ELECTRONIC DEVICES

FIELD OF THE INVENTION

The present invention relates to providing wireless communication functionality to portable electronic devices. More particularly, the present invention provides a wireless communication apparatus for wireless communication within portable electronic devices.

BACKGROUND OF THE INVENTION

As the continuing advances in technology have enabled the further miniaturization of the components required to build computer systems, new categories of computer systems have been created. One of the newer categories of computer systems developed has been the portable or "palmtop" computer system. This is commonly referred to as a personal digital assistant or PDA. Examples of other portable computer systems or portable electronic devices are electronic schedulers, electronic address books, electronic day planners, and the like. Because of the continuing miniaturizing of the computer systems and their related components, users of today's palmtop computer can now carry powerful computers.

A palmtop computer system, sufficiently diminutive to be carried in a users hand, is considered to be a "palm-sized" computer, and, as such, are readily carried about in a user's briefcase, purse, and in many circumstances, in the user's pocket. By virtue of the their diminutive size and weight, palmtop computers are exceptionally portable.

Furthermore, because of the power and features contained within the palmtop computer system, many users are foregoing the acquisition of a laptop computer and instead purchasing a palmtop computer system. As the palmtop computer becomes more prevalent in today's electronic world, users are desiring more functionality to be incorporated into the palmtop computer.

Although the miniaturization of computer components has enabled the development of the portable computer system, it is because of that diminutive size that there are inherent drawbacks to the palmtop computer system. It is because of the reduced size of the portable computer system that certain components and functions normally associated with a desktop computer or laptop computer have been eliminated. One such eliminated component is the communication modem, which provides a means of exchanging information between users and computer systems.

To overcome this drawback, an external modem has been developed, effectively replacing the eliminated modem. While this enables the user to communicate with others, it, too, is not without certain drawbacks. One or the drawbacks of an external modem is that a wired connection is still required to facilitate communication. This is accomplished by being connected to a phone line or by being connected to a desktop or laptop computer that has been configured to access a phone line or a network connection. Another drawback to the external modem is that it must be carried by the user, and, as such, may be considered unwieldy and cumbersome to the point that the user may not use it.

Another method to replace the functionality lost by the elimination of the wired modem has been with the development of new categories of wireless communication and transceivers. Regarding wireless communication, one such category of wireless communication that has been recently developed is Bluetooth technology. Bluetooth technology allows for the replacement of the many proprietary cables that connect one device to another with one universal short-range radio link. For instance, Bluetooth radio technology built into both the cellular telephone and the laptop would replace the cumbersome cable used today to connect a laptop to a cellular telephone. Printers, personal digital assistants (PDAs), portable computer systems, desktop computer systems, fax machines, keyboards, joysticks, and virtually any other digital device can be part of the Bluetooth system.

Regarding the replacing of the hard wired modem, a wireless transceiver has been developed to facilitate communication and utilize the new categories of wireless communication. While in some examples, this transceiver, while now wireless, is an external transceiver, and, as such, must still be carried by the user, and, therefore, is still as cumbersome and unwieldy as the wired modem. In another example, the wireless transceiver is internally disposed within the portable computer system, made possible, in part, by the continuing advances in component miniaturization. While a wireless transceiver, either internal or external, solves the problems of having a wired connection, certain drawbacks are inherent in the wireless transceiver.

One drawback of the wireless transceiver is the necessity to provide an antenna to facilitate the wireless communication. In one example, the antenna is mounted externally to the portable computer system, and designed to be extended above or away from the portable computer system. This configuration requires the user to physically extend the antenna, much like someone extending an automobile antenna to increase reception. By virtue of the antenna being externally mounted, and by requiring a user to manually extend the antenna, the antenna is prone to damage or being broken.

It is well known that an antenna, disposed in a single integrated device, will be subject to transceiver degradation when disposed near the components of a portable computer system or near lossy materials such as, e.g., the plastic that comprises the encasing body of the portable computer system, because the components or the lossy material will absorb some of the radio frequency energy such that the antenna's performance is detrimentally affected.

In another example, the antenna is configured as an external patch antenna that is mounted to the external surface of the portable computer system. While this relieves the user from having to physically extend the antenna, by virtue of the antenna being mounted on an external surface of the portable computer system, this antenna is also susceptible to damage or being broken.

In yet another example, the antenna is a co-planar antenna, which is mounted directly to the PCB (printed circuit board) of the portable computer system. While this configuration internally disposes the antenna within the portable computer system, it, too, is not without drawbacks. By disposing the antenna proximal to the electronic components and circuitry of the portable computer system, the antenna is subject to electromagnetic interference and distortion such that the functionality of the antenna is substantially reduced. Additionally, the proximal disposition of the antenna may subject the electronics of the portable electronic to electromagnetic interference and distortion so as to cause the portable electronic device to function improperly.

Thus a need exists for an external antenna (external, relative to the portable computer or electronic device) that provides enhanced functionality and improved performance to an internal antenna of a portable computer system. Furthermore, it is desirable to provide an antenna that is invisible to a user. It is also desirable to provide an antenna that requires no user intervention. It is further desirable to provide an antenna that is adapted such that the performance of the antenna is not diminished. It is additionally desirable to provide an antenna that does not interfere, either physically or electromagnetically, with the components and circuitry disposed within portable electronic devices.

SUMMARY OF THE INVENTION

Accordingly, the present invention provides a apparatus and system for providing an antenna disposed within a portable computer system to facilitate wireless communication. The present invention further provides an antenna which achieves the above listed accomplishment and which is invisible to a user. The present invention additionally provides an antenna which achieves the above listed accomplishments while requiring no user intervention. Additionally, the present invention provides an antenna that achieves the above listed accomplishments and that further provides maximum antenna performance while not interfering with the components and circuit of the portable electronic device.

The present invention provides an auxiliary antenna apparatus that is externally disposed (external relative to the portable electronic device) which provides enhanced functionality and improved performance of an antenna internal to the portable electronic device. The present invention further provides an apparatus aid system for wireless communication in a portable electronic device. In one embodiment, the present invention is communication of a wireless communication apparatus. In this embodiment, the present invention is comprised of a PCB (printed circuit board). It must be distinctly pointed out that the PCB of the present invention is separate and in addition to the PCB of the portable electronic device. The PCB is coupled with the portable electronic device. The present invention is further comprised of an antenna. The antenna is adapted to transceive a specific radio frequency band. The present invention is further comprised of a passive radiator.

These and other objects and advantages of the present invention will no doubt become obvious to those of ordinary skill in the art after having read the following detailed description of the preferred embodiments which are illustrated in the various drawing figures.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION

Figure 1:
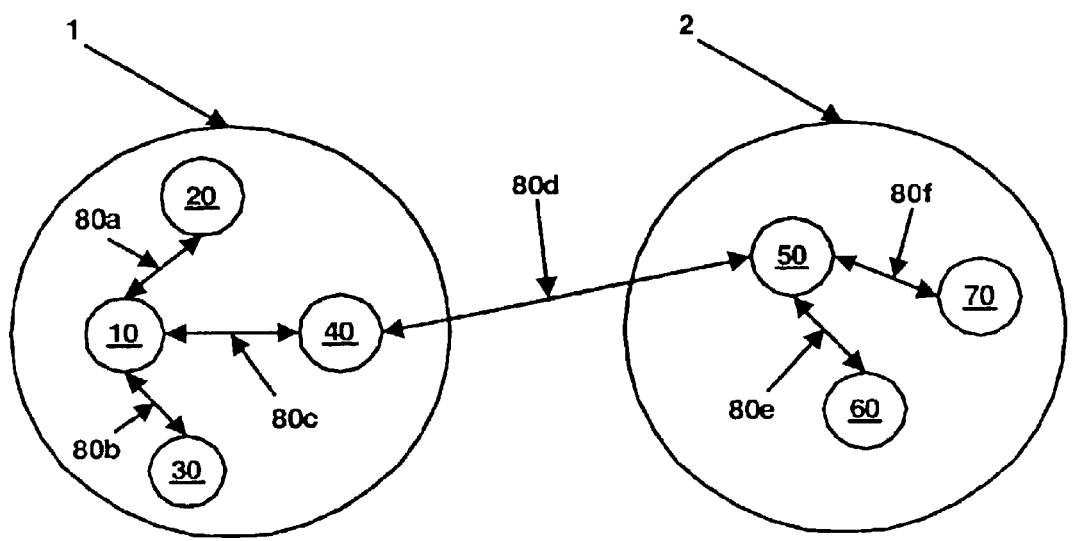
FIG. 1 illustrates one embodiment of a network of devices coupled using wireless connections in accordance with the present invention.

A wireless communication apparatus for a palmtop computer system is described. In the following description, for purposes of explanation, numerous specific details are set forth in order to provide a thorough understanding of the present invention. It will be obvious, however, to one skilled in the art that the present invention may be practiced without these specific details. In some instances, well-known structures and devices are shown in block diagram form in order to avoid obscuring the present invention. In other instances, well-known structures, devices, components, and circuitry are not shown so as not to obscure the present invention.

Notation and Nomenclature

Some portions of the detailed descriptions, which follow, are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "determining" or "transmitting" or "indicating" or "indexing" or "receiving" or "performing" or "initiating" or "sending" or "implementing" or "disabling" or "enabling" or "displaying" or "transceiving" or the like, refer to the action and processes of a computer system or similar electronic computing device, that manipulates and transforms data represented as physical (electronic) quantities within the computer system's registers and memories into other data similarly represented as physical quantities within the computer system memories or registers or other such information storage, transmission or display devices.

The present invention is discussed primarily in the context of a portable computer system, such as a palmtop computer or personal digital assistant. However, it is appreciated that the present invention can be used with other types of devices that have the capability to communicate wirelessly, including but not limited to palmtop computer systems.

Exemplary Bluetooth Platform

FIG. 1 illustrates the topology of a network of devices coupled using wireless connections in accordance with one embodiment of the present invention. In the parlance of Bluetooth, a collection of devices connected in a Bluetooth system are referred to as a "piconet" or a "subnet." A piconet starts with two connected devices, such as a computer system and a cellular phone, and may grow to eight connected devices. All Bluetooth devices are peer units; however, when establishing a piconet, one unit will act as a master and the other(s) as slave(s) for the duration of the piconet connection.

A Bluetooth system supports both point-to-point and point-to-multipoint connections. Several piconets can be established and linked together in a "scatternet," where each piconet is identified by a different frequency hopping sequence. All devices participating on the same piconet are synchronized to their respective hopping sequence.

Accordingly, devices 10, 20, 30 and 40 are coupled in piconet 1 using wireless connections 80*a*–*c*. Similarly, devices 50, 60 and 70 are coupled in piconet 2 using wireless connections 80*e*–*f* Piconet 1 and piconet 2 are coupled using wireless connection 80*d*. Devices 10–70 can be printers, personal digital assistants (PDAs), desktop computer systems, laptop computer systems, cell phones, fax machines, keyboards, joysticks, and, in one embodiment of the present invention; portable computer systems, portable electronic devices, or virtually any other digital device. In the present embodiment, devices 10–70 are Bluetooth devices; that is, they are equipped with a Bluetooth radio transceiver, or they are adapted to communicate with Bluetooth devices ("Bluetooth-enabled"). That is, the Bluetooth radio transceiver may be integrated into a device, or it may be coupled to a device.

Bluetooth radios operate in the ISM (Industrial, Scientific, Medical) band at 2.4 GHz. A frequency hop transceiver is applied to combat interference and fading. Bluetooth uses a packet-switching protocol based on a frequency hop scheme with 1600 hops/second. Slots can be reserved for synchronous packets. A packet nominally covers a single slot, but can be extended to cover up to five slots. Each packet is transmitted in a different hop frequency. The entire available frequency spectrum is used with 79 hops of one (1) MHz bandwidth, defined analogous to the IEEE (Institute of Electronic and Electrical Engineering) 802.11 standard. The frequency hopping scheme is combined with fast ARQ (Automatic Repeat Request), cyclic redundancy check (CRC) and Forward Error Correction (FEC) for data.

In the present embodiment, before any connections between Bluetooth devices are created, all devices are in standby mode. In this mode, an unconnected unit "listens" for messages at a regular rate (e.g., every 1.28 seconds) on a set of hop frequencies defined for that unit. The hold mode is a power saving mode that can be used for connected units if no data need to be transmitted. The sniff and park modes are also low power modes. In the sniff mode, a device listens to the piconet at a reduced rate (relative to the regular rate), thus reducing its duty cycle. The sniff interval is programmable and depends on the application. In the park mode, a device is still synchronized to the piconet but does not participate in the traffic.

A connection between devices is made by a "page" message if the address is already known, or by an "inquiry" message followed by a subsequent page message if the address is unknown.

Figure 2:
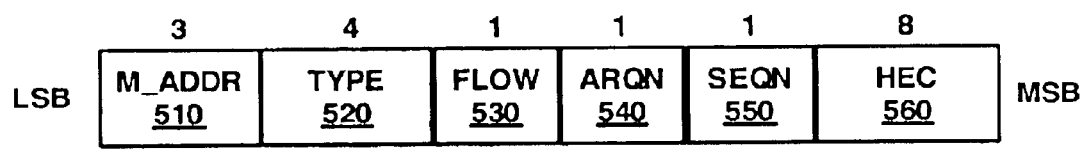
FIG. 2 illustrates a data packet format in accordance with one embodiment of the present invention.

FIG. 2 illustrates a format for a data packet 400 in accordance with one embodiment of the present invention. In the present embodiment, packet 400 consists of three fields: a 72-bit access code 410, a 54-bit header 420, and a payload 430 of variable length (2–342 bytes, or 16–2736 bits). Packet 400 may consist of the access code only, a shortened version of the access code, the access code and the header, or the access code, header and payload.

Access code 410 is used for synchronization, offset compensation and identification. Access code 410 identifies all packets exchanged on the channel of a piconet (e.g., piconet 1 and 2 of FIG. 1). All packets sent in the same piconet are preceded by the same channel access code.

Payload 430 carries user information and control information. In a data packet, payload 430 also contains data. A cyclic redundancy check (CRC) is added to each payload that contains data to verify the success of the reception of the data packet.

Figure 3:
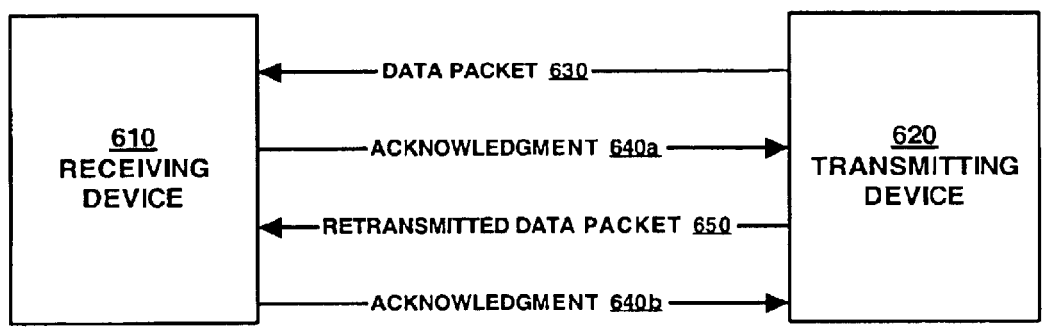
FIG. 3 illustrates a header format in a data packet in accordance with one embodiment of the present invention.

FIG. 3 illustrates a format of header 420 in a data packet 400 (FIG. 2) in accordance with one embodiment of the present invention. Header 420 contains lower-level link control information. In the present embodiment, header 420 consists of six (6) fields: a 3-bit sub address (M_ADDR 510), a 4-bit packet type (TYPE 520), a 1-bit flow control bit (FLOW 530), a 1-bit acknowledge indication (ARQN 540), a 1-bit sequence number (SEQN 550), and an 8-bit header error check (HEC 560). In this embodiment, the total header information consists of 18 bits, but it is protected with a ⅓ forward-error correction (FEC) coding resulting in a 54-bit header length.

In the present embodiment, M_ADDR (Medium Access Control Address) 510 represents a Medium Access Control (MAC) address and is used to distinguish between the participant devices of a piconet. Typically, several slave devices ("slaves") are connected to a single master device ("masters"). To identify each slave separately, each slave is assigned a temporary MAC address for the duration of the connection. Packets exchanged between the master and a slave all carry the M_ADDR of this slave. The all-zero address is reserved for broadcasting purposes.

In the Bluetooth embodiment, a link type is used to define what type of packets can be used on a particular link. The Bluetooth technology supports two link types: Synchronous Connection Oriented (SCO) used primarily for voice, and Asynchronous Correctionless (ACL) used primarily for data. In the present embodiment, sixteen different types of packets can be distinguished. The 4-bit TYPE 520 code specifies which packet type is used. The interpretation of the TYPE 520 code depends on the physical link type associated with the packet. First, it is determined whether the packet is a SCO link packet or an ACL link packet. Then, it is determined which of the SCO packet types or ACL packet types is being dealt with. The TYPE 520 code also reveals how many slots the current packet will occupy.

In the present embodiment, the FLOW 530 bit is used for flow control over the ACL link. When the receiver buffer for the ACL connection in the receiving device is full and is not emptied by the link support unit, a STOP indication (FLOW=0) is returned to stop the transmission of data temporarily. In this embodiment, the STOP signal only concerns ACL packets, and so packets including only link control (POLL and NULL packets) or SCO packets can still be received. When the receive buffer is empty, a GO indication (FLOW=1) is returned. When no packet is received or the received header is in error, a GO is assumed implicitly.

In the present embodiment of the present invention, the ARQN 540 bit is an acknowledge field to inform the transmitting device whether the reception of the data packet in the preceding slot was successful (ARQN=1) or unsuccessful (ARQN=0). When no valid ARQN field is received, ARQN=0 is assumed implicitly. ARQN=0 is the default value. ARQN 540 is piggybacked in the return data packet (e.g., an acknowledge signal) sent to the transmitting device by the receiving device. The success of the reception is checked by the receiving device by means of the CRC which is added to each payload that contains data. In the present embodiment, an unnumbered ARQ scheme is used, which means that ARQN 540 relates to the packet just received.

In the present embodiment, SEQN (Sequential Numbering Scheme) 550 is a numbering field to distinguish new packets from retransmitted packets. The SEQN 550 bit is toggled by the transmitting device for each new packet transmission. A retransmitted packet keeps the same SEQN 550 bit. If two consecutive packets are received with the same SEQN 550 bit, the second packet is ignored by the receiving device.

In the present embodiment, each header has a header error check (HEC) 560 so that the receiving device can check the header integrity. If the HEC 560 does not check, the entire packet is disregarded by the receiving device.

Figure 4:
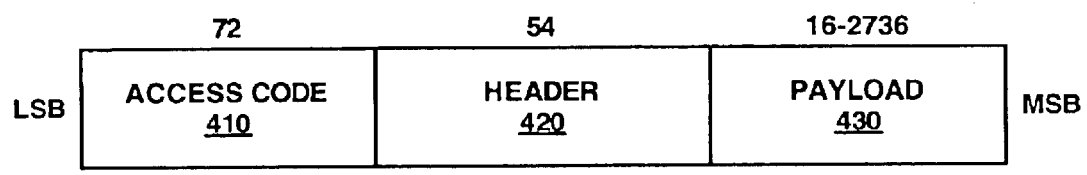
FIG. 4 diagrams a transfer of data packets between receiving and transmitting devices in accordance with one embodiment of the present invention.

FIG. 4 diagrams a transfer of data packets between receiving device 610 and transmitting device 620 in accordance with one embodiment of the present invention. In one embodiment, receiving device 610 and transmitting device 620 are Bluetooth devices or Bluetooth-enabled devices.

In the present embodiment, an unnumbered ARQ scheme is applied in which a data packet transmitted in one slot is directly acknowledged by the receiving device in the next slot. For a data transmission to be acknowledged (ARQN=1), both the HEC 560 and the CRC must check; otherwise a negative acknowledge NAK (ARQN=0) is returned (refer to FIG. 3).

Continuing with reference to FIG. 4 and with reference also to FIGS. 2 and 3, in the present embodiment, data packet 630 is received by receiving device 610. Data packet 630 has a data payload 430 including a CRC. In one embodiment, link controller 220 (FIG. 12) of receiving device 610 first checks the HEC 560 in data packet 630. If the HEC 560 checks, the payload CRC is checked. If the CRC checks as well, the ARQN 540 field in the return packet (e.g., acknowledgment 640*a*) is set to a binary 1 (ARQN=1). Otherwise the ARQN 540 field in acknowledgment 640*a* is set to binary zero (ARQN=0). When the HEC 560 and CRC check, the payload 430 is accepted, provided SEQN 550 in the packet header 420 differs from the SEQN 550 in the last successfully received packet (e.g., the data packet preceding data packet 630). Otherwise the payload 430 is discarded.

On reception of acknowledgment 640*a*, in one embodiment, link controller 220 (FIG. 12) of transmitting device 620 first checks the HEC of acknowledgment 640*a*. If the HEC checks, it reads the ARQN field in the header of acknowledgment 640*a*. If ARQN=1, the sender toggles SEQN 550 in the next data packet and transmits that data packet in the next transmit slot. If the HEC does not check or a NAK (ARQN=0) has been received, SEQN 550 is not toggled and the previous payload 430 is retransmitted (that is, data packet 630 is resent as retransmitted data packet 650). Upon receipt of retransmitted data packet 650 by receiving device 610, the HEC and CRC are checked, the SEQN bit is read, and acknowledgment 640*b* is sent. The contents of acknowledgment 640*b* are dependent on the HEC and CRC results, as described above. This scheme is repeated for each data packet until all data packets are successfully transmitted and received.

The ARQ scheme described above is carried out separately between the master and each slave. The master receives acknowledgment data of master-to-slave information directly in the slave-to-master slot following the master-to-slave slot. Acknowledgment data of slave-to-master information are received in the next master-to-slave slot in which the master addresses the slave.

Exemplary Palmtop Platform

Figure 5:
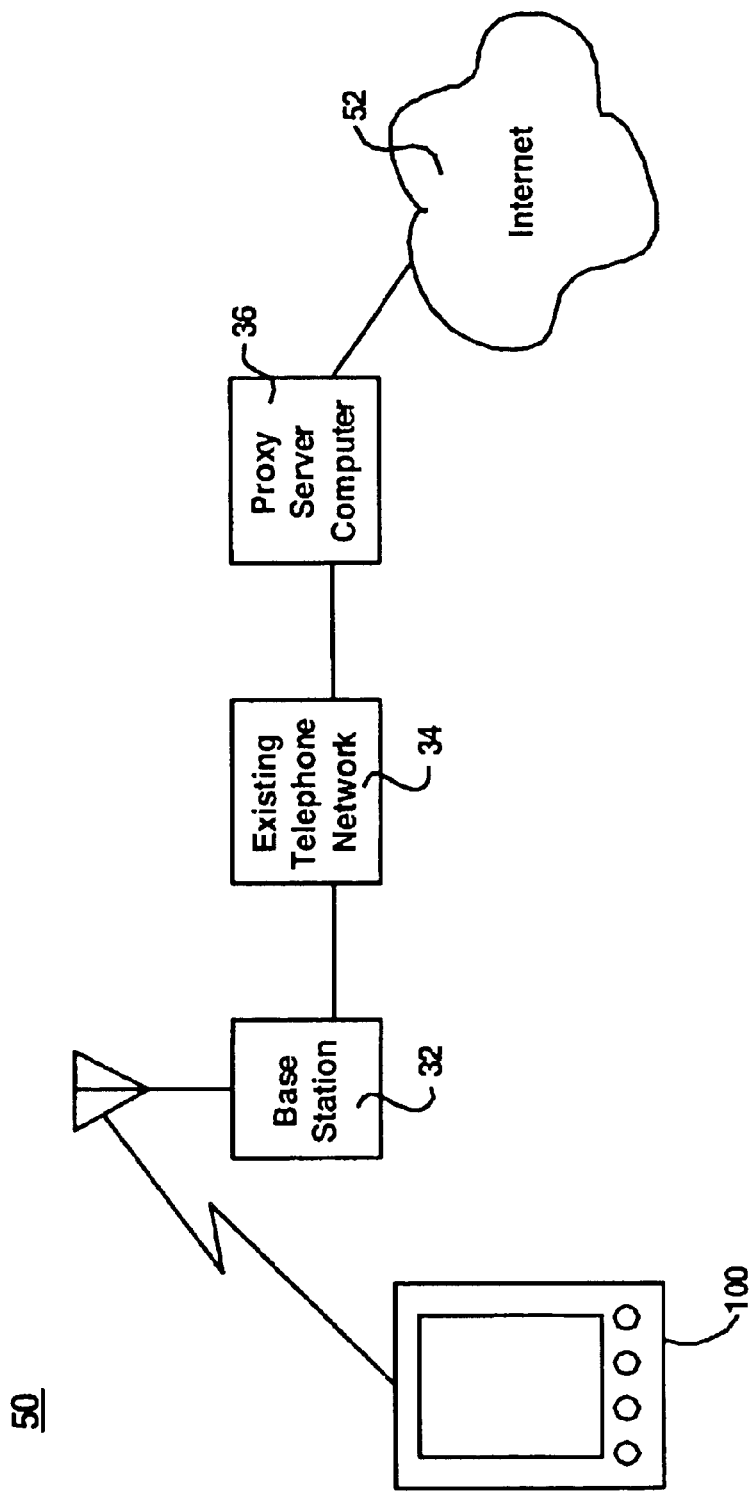
FIG. 5 is a block diagram of an exemplary network environment including a portable computer system in accordance with one embodiment of the present invention.

FIG. 5 is a block diagram of an exemplary network environment 50 including a portable computer system 100 in accordance with one embodiment of the present invention. Portable computer system 100 is also known as a palmtop or palm-sized computer system. In one embodiment, portable computer system 100 has the ability to transmit and receive data and information over a wireless communication interface (e.g., a radio interface). For purposes of the present application, the term "portable computer system" is not intended to be limited solely to conventional palmtop or portable computers. Instead, the term "palmtop computer" or "portable computer system" is also intended to include any mobile device which can be used to wirelessly communicate with a network. Such mobile devices include but are not limited to pagers and paging systems, wireless and cellular telephones, electronic address books, and numerous other mobile devices which have the ability to wirelessly communicate with a network. As such, for purposes of the present application, the terms "portable computer" and "mobile device" will be considered synonymous and will be used interchangeably throughout the present application.

In the present embodiment, base station 32 is both a transmitter and receiver base station, which can be implemented by coupling it into an existing public telephone network 34. Implemented in this manner, base station 32 enables portable computer system 100 to communicate with a proxy server computer system 36, which is coupled by wire to the existing public telephone network 34. Furthermore, proxy server computer system 36 is coupled to the Internet 52, thereby enabling portable computer system 100 to communicate with the Internet 52. When communicating with a Web site over Internet 52, protocols such as CTP (Compact Transport Protocol) and CML (Compact Markup Language) can be used by portable computer system 100 in the present embodiment.

It should be appreciated that within the present embodiment, one of the functions of proxy server 36 is to perform operations over the Internet 52 on behalf of portable computer system 100. For example, proxy server 36 has a particular Internet address and acts as a proxy device for portable computer system 100 over the Internet 52.

It should be further appreciated that other embodiments of a communications network, planned or envisioned, may be utilized in accordance with the present invention. For example, a wireless connection may be made from portable computer system 100 directly to the Internet 52.

The data and information which are communicated between base station 32 and portable computer system 100 are the same type of information and data that can conventionally be transferred and received over a public telephone wire network system. Additionally, in FIG. 5, the existing telephone network could also be a packet-based network utilized by some conventional portable computer systems. However, a wireless communication interface is utilized to communicate data and information between portable computer system 100 and base station 32. It should be appreciated that one embodiment of a wireless communication system in accordance with the present invention is the Bluetooth wireless communication system. Furthermore, nearly all wireless networks, in addition to the Bluetooth wireless network, can support the functionality to be disclosed herein.

Figure 6:
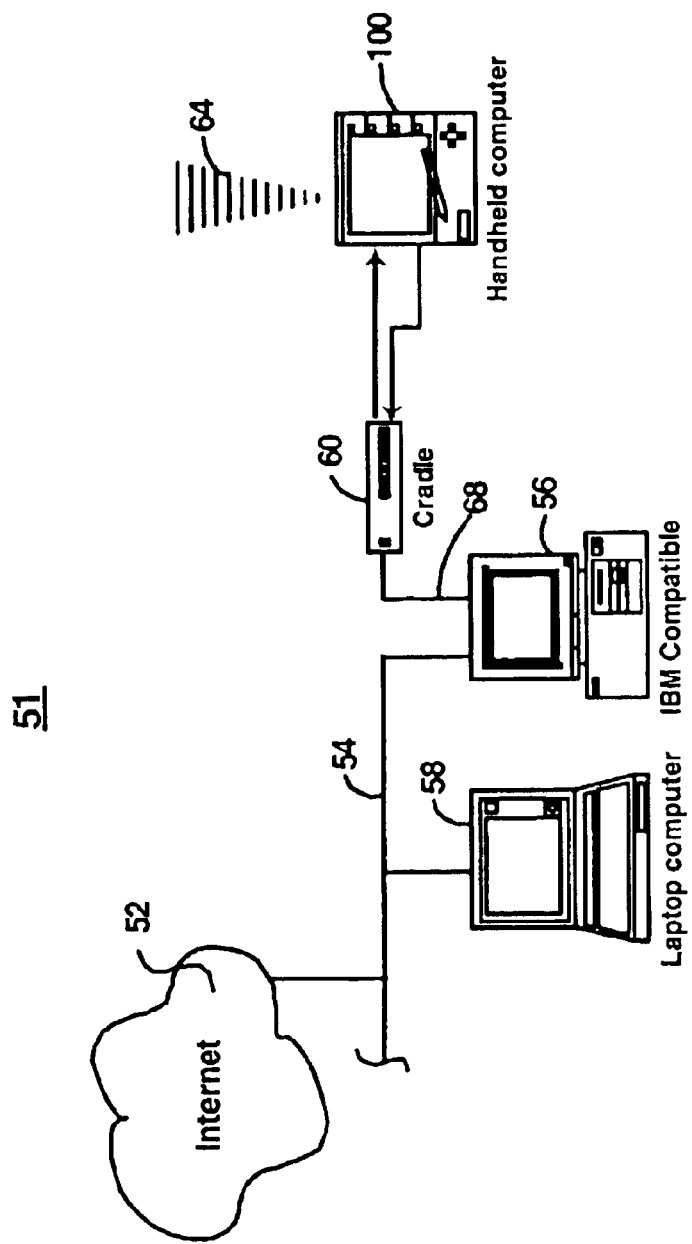
FIG. 6 is a block diagram of a portable computer system connected to other computer systems and the Internet via a cradle device in accordance with one embodiment of the present invention.

FIG. 6 illustrates another embodiment of a system 51 that can be used in conjunction with various embodiments of the present invention. System 51 comprises a host computer system 56 which can either be a desktop unit as shown, or, alternatively, can be a laptop system 58. Optionally, one or more host computer systems can be used within system 51. Host computer systems 58 and 56 are shown connected to a communication bus 54, which in one embodiment can be a serial communication bus, but could be of any of a number of well known designs, e.g., a parallel bus, Ethernet Local Area Network (LAN), etc. Optionally, bus 54 can provide communication with the Internet 52 using a number of well-known protocols.

Importantly, bus 54 is also coupled to a cradle 60 for receiving and initiating communication with portable computer system 100 ("handheld computer") of the present invention. Cradle 60 provides an electrical and mechanical communication interface between bus 54 (and anything coupled to bus 54) and the computer system 100 for two-way communications. It is appreciated that, in accordance with the present invention, portable computer system 100 may instead be coupled to host computer systems 56 and 58 via a wireless (radio) connection. Computer system 100 also contains a wireless infrared communication mechanism 64 for sending and receiving information from other devices. Additionally, in FIG. 6, the existing telephone network could also be a packet-based network, as is the Bluetooth wireless data network utilized by some conventional portable computer systems.

With reference to both FIGS. 5 and 6, it is appreciated that portable computer system 100 can be used in a network environment combining elements of networks 50 and 51. That is, portable computer system 100 can include both a wireless infrared communication mechanism and a signal (e.g., radio) receiver/transmitter device.

Implementation of the Present Invention

Figure 7:
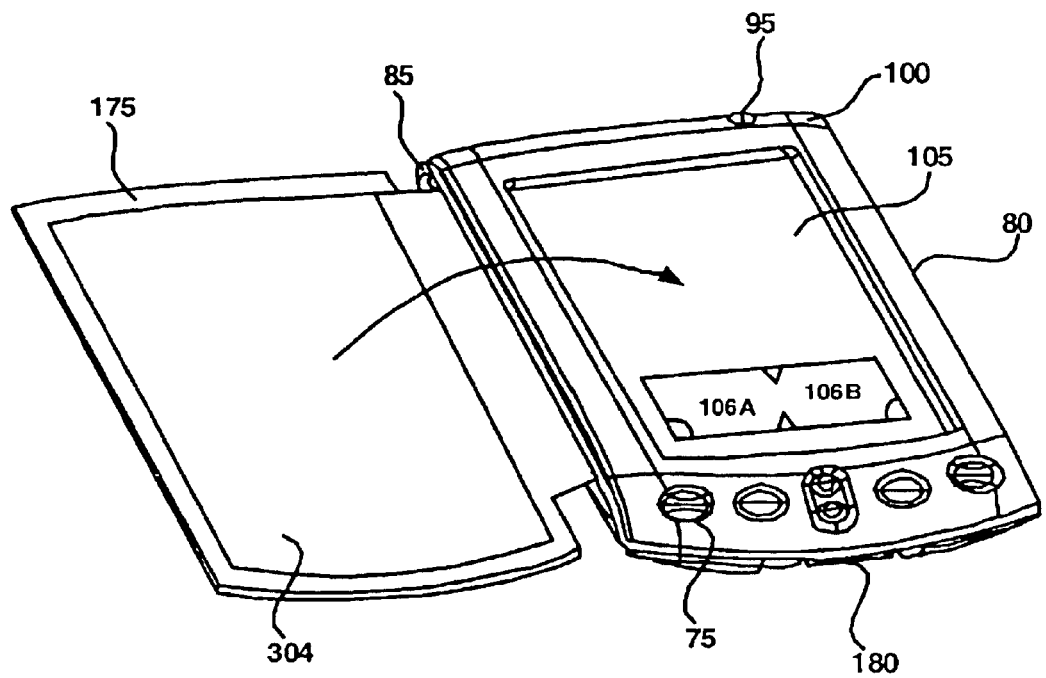
FIG. 7 is a top side perspective view of a portable computer system in accordance with one embodiment of the present invention.

FIG. 7 is a perspective illustration of the top face 100a of one embodiment of the palmtop computer system 100 of the present invention. The top face 100a contains a display screen 105 surrounded by a bezel or cover. A removable stylus 80 is disposed along the right side of portable computer system, but by virtue of the angle of the illustration, is not shown. An extendible antenna 85, disposed along the left side is also shown. The display screen 105 is a flexible display panel able to register contact between the screen and the tip of the stylus 80. The stylus 80 can be of any material to make contact with the screen 105. The top face 100a also contains one or more dedicated and/or programmable buttons 75 for selecting information and causing the computer system to implement functions. The on/off button 95 is also shown.

It should be appreciated that when portable computer 100 is equipped with a front cover 175, in one embodiment of the present invention, front cover 175, adapted to provide protection against damage to display screen 105, may rotate as shown by the arrow, about the axis, or hinge, as shown in FIG. 7.

It should be appreciated that in the present embodiment of the present invention, portable computer system 100 is equipped with a front cover 175 and communicatively coupled with portable computer 100. It should be further noted that in one embodiment of the present invention, the present invention is disposed within front cover 175. Shown as disposed within front cover 175 is underside cover 304, adapted to fit within the underside of front cover 175 such that protection against damage or incidental contact is provided to the components of the present invention contained within front cover 175. Underside cover 304 is shown in detail in FIG. 10.

For the purposes of this disclosure, the present invention, in one embodiment, is shown as implemented in a portable electronic device that is not RF enabled. As such, an additional PCB, separate of the PCB(s) of the electronic device, is provided. Further, by virtue of the present invention providing its own PCB on which is disposed its own circuitry, the present invention provides enablement of the host electronic device to communicate wirelessly.

However, although the present invention is adapted to be implemented in a portable electronic device that is not RF enabled, the present invention is equally suited to be implemented in those portable electronic devices having an antenna coupled thereto and that are RF enabled. In those instances, the PCB and the related circuitry provided by the present invention are not necessary. Therefore, in another embodiment of the present invention, the passive radiator of the present invention is coupled with the portable electronic device and is communicatively coupled with the antenna internal to the portable electronic device. As such, the present invention, providing a passive radiator that is on the outside of the portable electronic device (external relative to the electronic device), enhances function and improves performance of the antenna internal to the electronic device to which it is coupled.

It should be appreciated that in another embodiment, the present invention is configured such that it is self contained within its own encasing structure. In this embodiment, the present invention is adapted to receive a portable electronic device. Further, the present invention is adapted such that when the portable electronic device is received, the present invention is communicatively coupled with the portable electronic device. Therefore, the present invention in this embodiment, provides wireless communication functionality to the portable electronic device.

FIG. 7 also illustrates a handwriting recognition pad or "digitizer" containing two regions 106a and 106b. Region 106a is for the drawing of alphabetic characters therein (and not for numeric characters) for automatic recognition, and region 106b is for the drawing of numeric characters therein (and not for alphabetic characters) for automatic recognition. The stylus 80 is used for stroking a character within one of the regions 106a and 106b. The stroke information is then fed to an internal processor for automatic character recognition. Once characters are recognized, they are typically displayed on display screen 105 for verification and/or modification.

Figure 8:
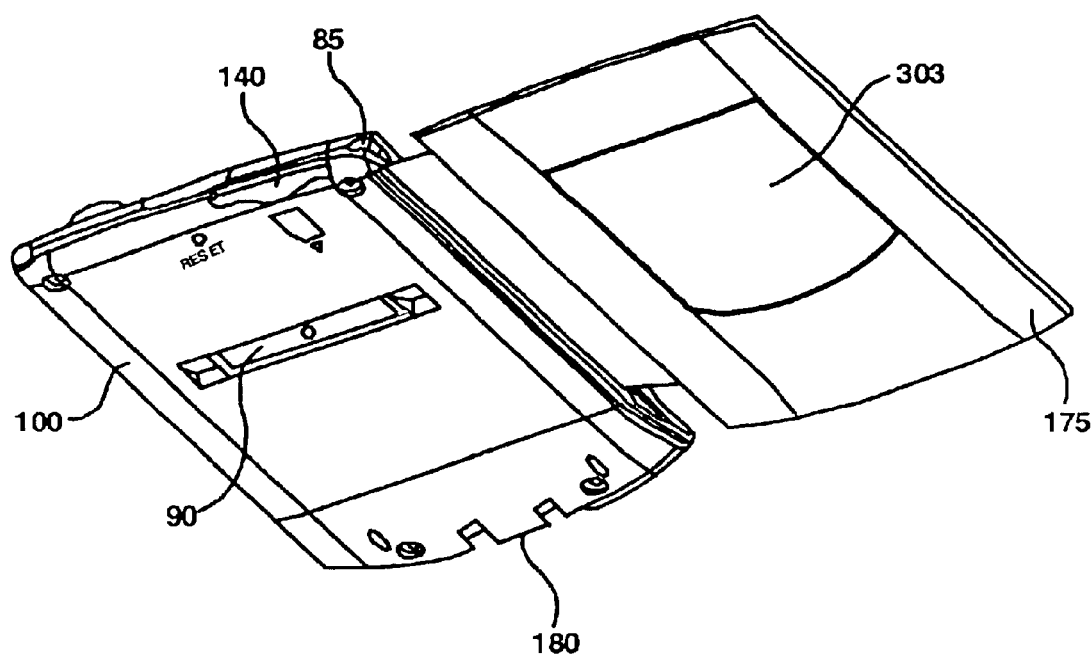
FIG. 8 is a bottom side perspective view of the portable computer system of FIG. 7.

FIG. 8 is a rear angled perspective illustration 110b of the back face and back of front cover 175 of portable computer system 100 of FIG. 7, in one embodiment of the palmtop computer system that can be used in accordance with various embodiments of the present invention. A battery storage compartment door 90 is shown. Extendible antenna 85 is also shown. Portable computer system 100 is shown as having optional data storage device receptacle 140, adapted to receive optional data storage devices, e.g., memory sticks, secure data cards, and the like. A communication interface 180 is also shown. In one embodiment of the present invention, the communication interface 180 is a serial communication port, but could also alternatively be of any of a number of well-known communication standards and protocols, e.g., parallel, SCSI (small computer system interface), Firewire (IEEE 1394), Ethernet, etc.

Still referring to FIG. 8, shown is front cover 175, communicatively coupled with portable computer system 100. As previously noted in FIG. 7, in one embodiment of the present invention, the present invention is disposed within front cover 175. Passive radiator 303, shown as oriented with one externally exposed surface, is disposed within front cover 175 and is adapted to re-radiate energy received from antenna 300 (FIG. 10) and PCB (printed circuit board) 302 (FIG. 10).

Figure 9:
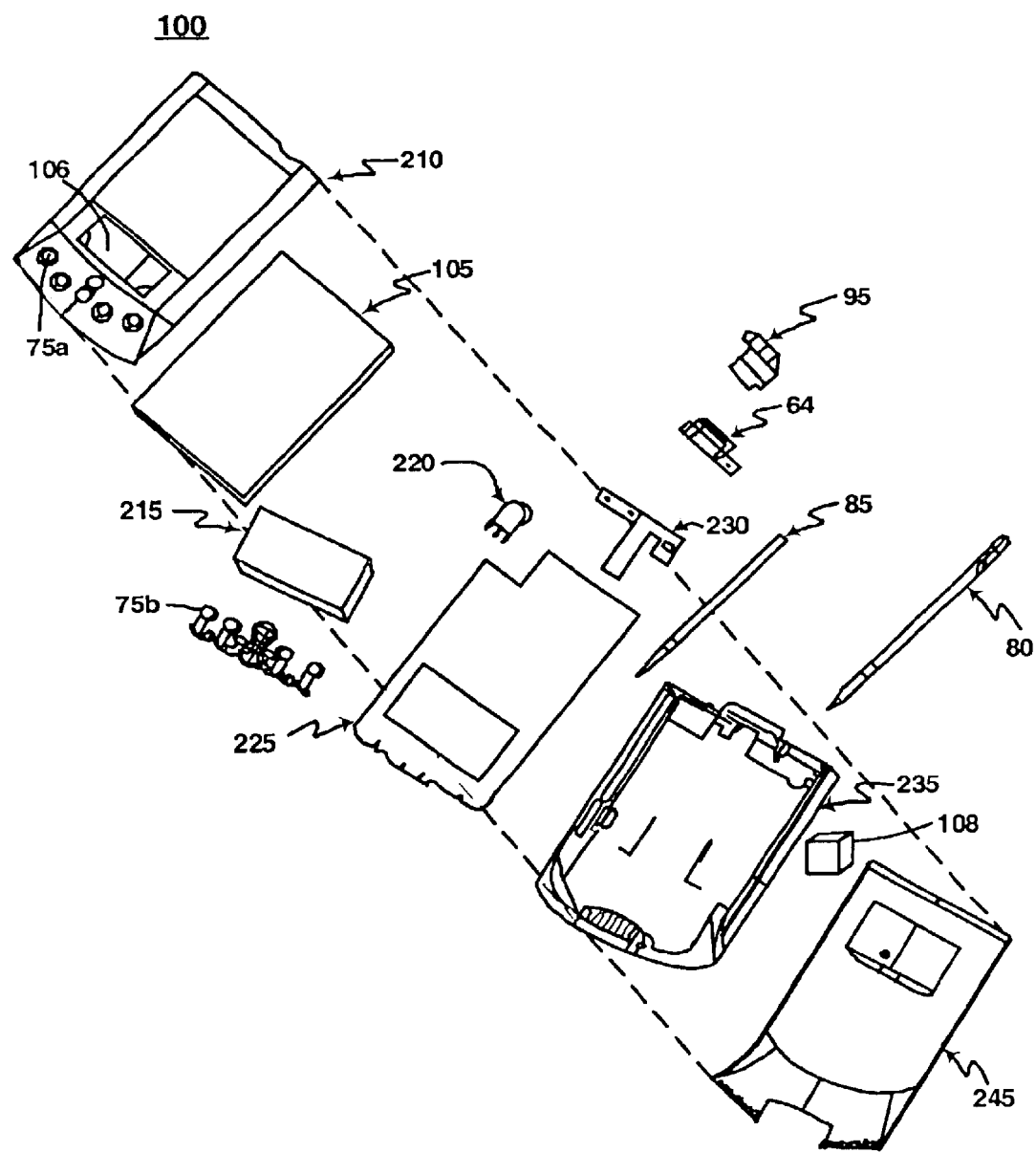
FIG. 9 is an exploded view of the components of the portable computer system of FIG. 7.

FIG. 9 is an exploded view of the palmtop computer system 100 in accordance with one implementation. It should be noted that front cover 175, as depicted in FIGS. 7 and 8, is not shown so as to simplify the description of the exploded view of portable computer 100. Computer system 100 contains a back case half 245, and a front case half 210 having an outline of region 106 and holes 75a for receiving buttons 75b. Flexible display panel 105 is disposed on front case half 210, analogous to the flexible display panel of FIG. 7. A battery 215 provides electrical power. A contrast adjustment (potentiometer) 220 is also shown, as well as an on/off button 95. A flex circuit 230 is shown along with a printed circuit (PC) board 225 containing electronics and logic (e.g., memory, communication bus, processor, etc.) for implementing computer system functionality. The digitizer pad is also included in PC board 225. A midframe 235 is shown along with stylus 80. Also shown is extendible antenna 85.

Infrared communication mechanism 64 (e.g., an infrared emitter and detector device) is for sending and receiving information from other similarly equipped devices (see FIG. 6). A signal (e.g., radio) receiver/transmitter device 108 is also shown. The receiver/transmitter device 108 is coupled with front cover 175 and also coupled to communicate with the PC board 225. In one embodiment of the present invention, the Bluetooth wireless communication system is used to provide two-way communication. In another implementation of one embodiment of the present invention, the Mobitex wireless communication system is used to provide two-way communication between computer system 100 and other networked computers and/or the Internet via a proxy server (see FIG. 5).

Figure 10:
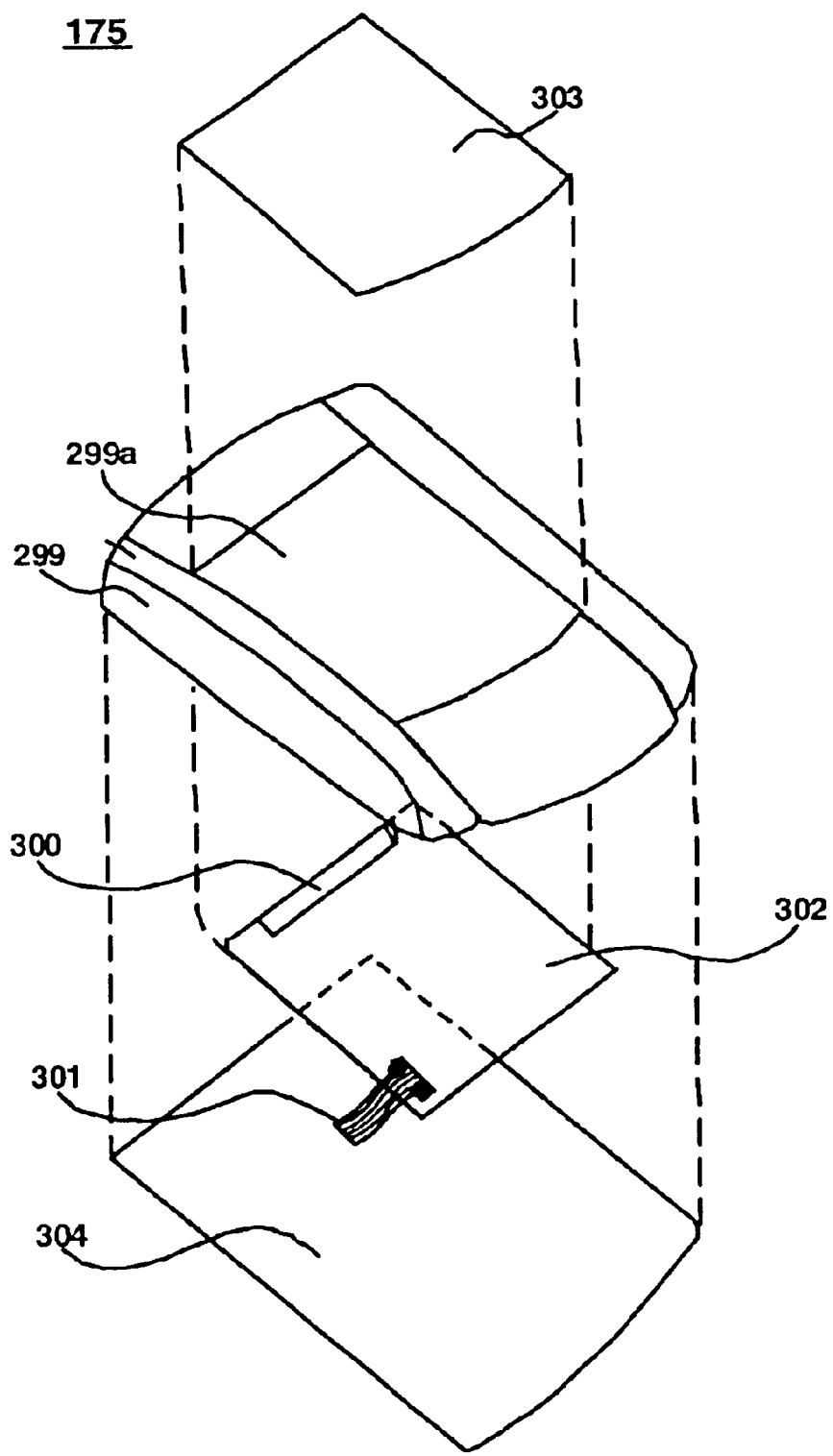
FIG. 10 is an exploded view of the components of the front cover of the portable computer system of FIG. 7.

FIG. 10 is an exploded view of hinged front cover 175, wherein the present invention is disposed, which is communicatively coupled and hingeably attached with palmtop computer system 100, in one embodiment of the present invention. It should be noted that the main body portion of palmtop computer system 100, as depicted in FIGS. 7, 8, and 9, is not shown so as to simplify the description of the exploded view of hinged front cover 175.

Front cover 175 contains a front cover body portion 299 having a opening 299a. In one embodiment of the present invention, passive radiator 303 fits onto front cover body portion 299 and is supported within opening 299a. Passive radiator 303 is adapted to re-radiate energy received from antenna 300 and PCB (printed circuit board) 302, such that the radiation pattern becomes more omnidirectional and less multi-lobed. It should be appreciated that passive radiator 303 is comprised of a resonant conductive patch. In one embodiment of the present invention, the composition of passive radiator is metal. It should be further appreciated that a surface of passive radiator 303 should be exposed, either externally, or under a material, e.g., ABS plastic, that is transparent to radio signals, such that the radio signals are not blocked. Hence, the present invention's passive radiator is disposed on the outside of the electronic device (external relative to the device) thereby enhancing the function and performance of the antenna internal to the device.

Referring still to FIG. 10, PCB (printed circuit board) 302 is adapted to fit beneath passive radiator 303 and within opening 299a. It should be particularly noted, in one embodiment, that one of the linear dimensions (length, width) of PCB 302 is such that it is an equivalent to an electrical half-wavelength of a specific radio frequency band. In one embodiment of the present invention, one dimension of PCB 302 is equivalent to a half-wavelength of the radio frequency band utilized by the Bluetooth communication system, 2.4 GHz, and, as such, would have as one of the linear dimensions, (e.g., length or width) approximately 2.45 inches.

It should be appreciated that while one embodiment of the present invention is depicted and described as utilizing the Bluetooth wireless radio frequency of 2.4 GHz, this should not be construed as a limitation as to the range of frequencies that may be utilized by the present invention. In another embodiment of the present invention, PCB 302 could have as one of its linear dimensions an equivalent half-wavelength of the radio frequency 1.92 GHz, or approximately 3.05 inches. In yet another embodiment, PCB 302 could have the equivalent linear dimension of a half-wavelength for the radio frequency of 1.79 GHz, or approximately 3.3 inches. In still another embodiment, PCB 302 may be configured to have as one of its linear dimensions, an equivalent to a quarter-wavelength of a specific radio frequency, so as to increase the range of radio frequencies with which the present invention may provide wireless communication. It is therefore readily apparent that the present invention may be implemented for use with an almost unlimited number of radio frequencies. Hence, the passive radiator, disposed outside the electronic device (external relative to the electronic device) enhances function and improves performance of the antenna disposed internal of the electronic device.

Still in FIG. 10, antenna 300 is coupled with and disposed upon PCB 302. Antenna 300 is adapted to transceive a specific radio frequency band. In one embodiment of the present invention, antenna 300 is of a folded-element design. In the present embodiment, antenna 300 is manufactured by RangeStar Wireless Inc. of Aptos, Calif. It should be appreciated that while antenna 300 is shown as disposed near the upper edge of PCB 302, it may be disposed along the other edges as well. Flexible electrical connector 301 is coupled to and disposed upon PCB 302. Flexible electrical connector 301 is adapted to provide the communicative coupling between PCB 301 and PCB 225 of the main body portion of portable computer system 100. Underside cover 304 is adapted to fit within the underside of the front cover 175 so as to protect the components therein.

It should be appreciated, in one embodiment of the present invention, that by the virtue of passive radiator 303 being oriented such that it covers PCB 302 and underside cover 304 being oriented such it covers the side of PCB 302 not covered by passive radiator 303, antenna 301 is invisible to the user. Further appreciated, in the present embodiment, is that antenna 301 requires no user intervention, e.g., extending the antenna or rotating the antenna away from the portable electronic device. Moreover, the passive radiator that is on the outside of the device (external relative to the electronic device) enhances function and improves performance of the antenna internal to the electronic device.

Figure 11:
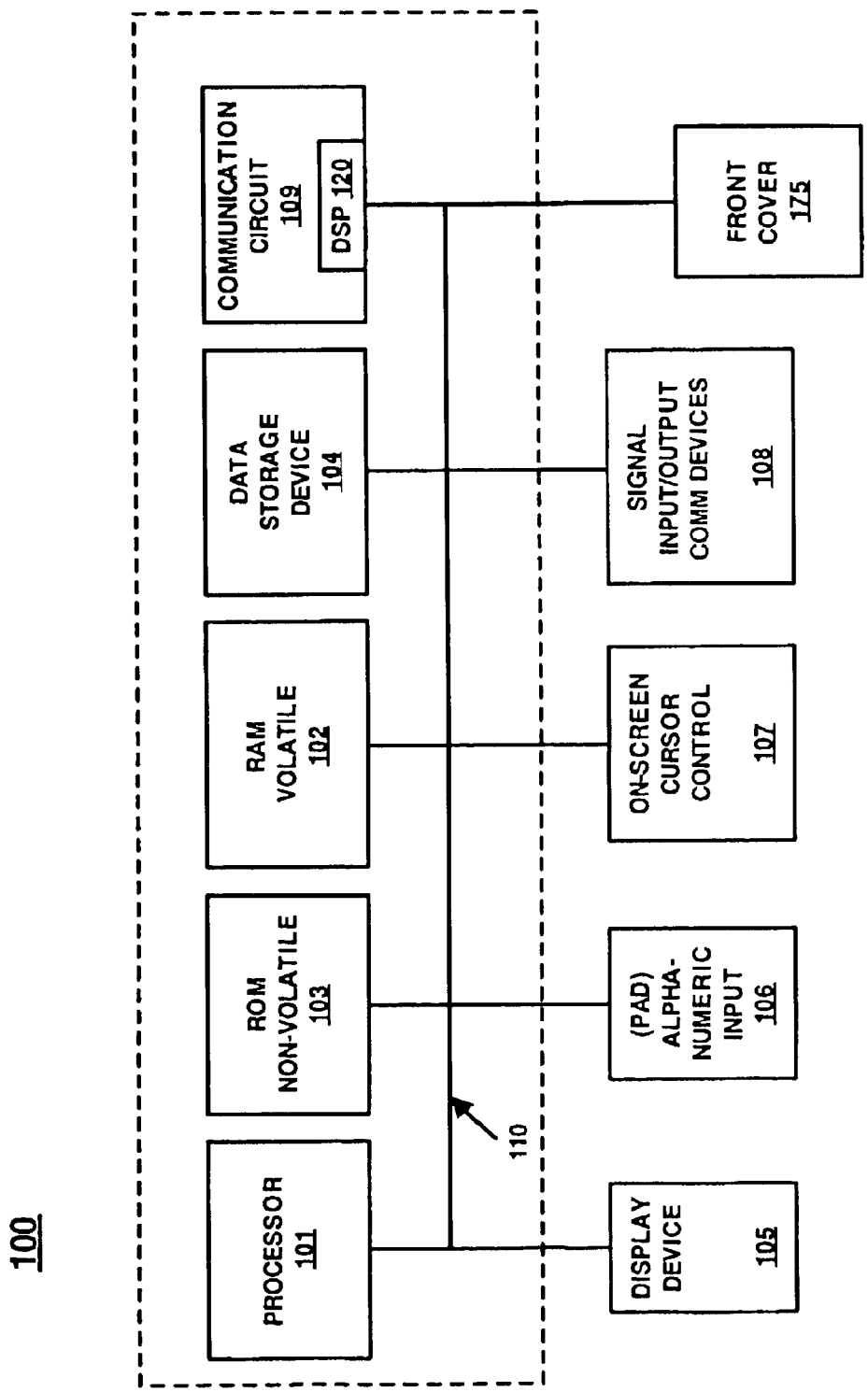
FIG. 11 is a block diagram of the electronics of one embodiment of a portable computer system in accordance with one embodiment of the present invention.

FIG. 11 is a functional block diagram of the main body portion of computer system 100, some of which can be implemented on PC board 225 (FIG. 9). Computer system 100 includes an address/data bus 110 for communicating information, a central processor 101 coupled with the bus for processing information and instructions, a volatile memory 102 (e.g., random access memory, RAM) coupled with the bus 110 for storing information and instructions for the central processor 101 and a non-volatile memory 103 (e.g., read only memory, ROM) coupled with the bus 110 for storing static information and instructions for the processor 101. Computer system 100 also includes an optional data storage device 104 (e.g., memory stick) coupled with the bus 110 for storing information and instructions. Device 104 can be removable. As described above, computer system 100 also contains display device 105 (e.g., flexible display panel 105) coupled to the bus 110 for displaying information to the computer user. PC board 225 can contain the processor 101, the bus 110, the ROM 103 and the RAM 102.

With reference still to FIG. 11, computer system 100 also includes a signal transmitter/receiver device 108, which is coupled to bus 110 for providing a physical communication link between computer system 100, and a network environment (e.g., network environments 50 and 51 of FIGS. 5 and 6, respectively). As such, signal transmitter/receiver device 108 enables central processor unit 101 to communicate wirelessly with other electronic systems coupled to the network. It should be further appreciated that the present embodiment of signal transmitter/receiver device 108 is well suited to be implemented in a wide variety of ways. For example, signal transmitter/receiver device 108 could be implemented as a modem.

In one embodiment, computer system 100 includes a communication circuit 109 coupled to bus 110. Communication circuit 109 includes an optional digital signal processor (DSP) 120 for processing data to be transmitted or data that are received via signal transmitter/receiver device 108. Alternatively, processor 101 can perform some or all of the functions performed by DSP 120.

Also included in computer system 100 of FIG. 11 is an optional alphanumeric input device 106 that in one implementation is a handwriting recognition pad ("digitizer") having regions 106a and 106b (FIG. 7), for instance. Alphanumeric input device 106 can communicate information and command selections to processor 101. Computer system 100 also includes an optional cursor control or directing device ( on-screen cursor control 107) coupled to bus 110 for communicating user input information and command selections to processor 101. In one implementation, on-screen cursor control device 107 is a flexible touch sensor 501 (FIG. 7) incorporated with display device 105. On-screen cursor control device 107 (e.g., flexible touch sensor 105) is capable of registering a position on display device 105 where the stylus makes contact. Display device 105 is suitable for generating graphic images and alphanumeric characters recognizable to the user. In the preferred embodiment, display device 105 is a flexible display panel. Front cover 175 is coupled to portable computer system via bus 110 to facilitate communication between portable computer system 100 and front cover 175.

Figure 12:
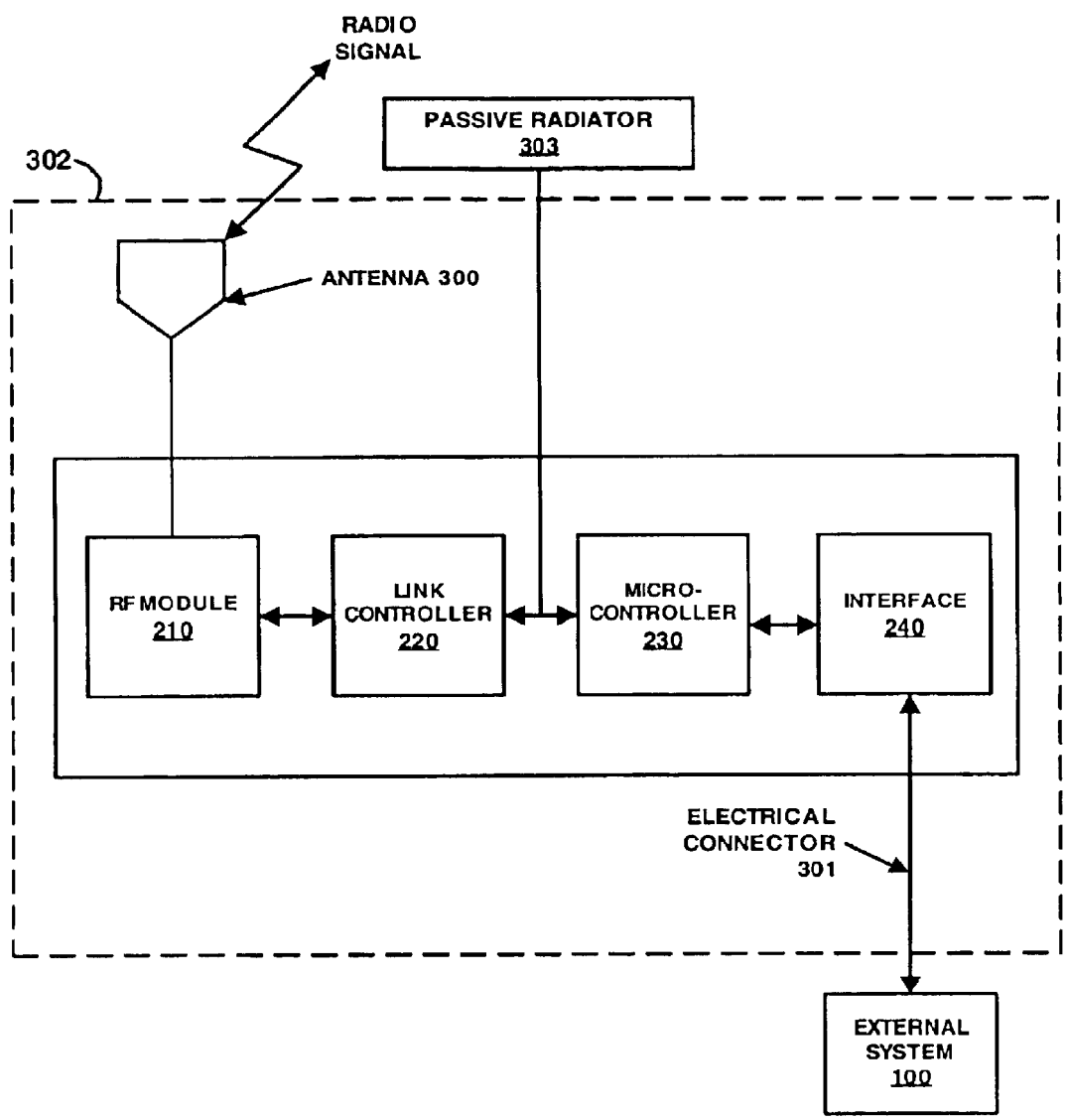
FIG. 12 is a block diagram of the electronics of one embodiment of a front cover of a portable computer system equipped with the present invention, in accordance with one embodiment of the present invention.

FIG. 12 is a functional block diagram of wireless communication apparatus 108F of the front cover 175 of portable computer system 100, some of which can be implemented on PCB 302 (FIG. 10). In one embodiment of the present invention (the "Bluetooth embodiment"), transceiver 108F is a Bluetooth device comprising a digital component (e.g., a Bluetooth controller) and an analog component (e.g., a Bluetooth radio).

In the present embodiment, passive radiator 303 is coupled with PCB 302. Passive radiator 303 provides a more omnidirectional transceiving functionality to the portable computer system than is normally associated with simpler antennas.

In the present embodiment, transceiver 108F comprises antenna 300 for receiving or transmitting radio signals, a radio frequency (RF) module 210, a link controller 220, a microcontroller (or central processing unit) 230, and an external interface 240. In one embodiment of the present invention, transceiver 108F is coupled by a system bus 100 to an external device 290. In the present embodiment of the present invention, external device 290 is the main body portion of portable computer system 100. It should be appreciated that external device 290 could be almost any portable electronic device (e.g., a host device such as a computer system or similar intelligent electronic device, a printer, a fax machine, etc.). However, it is appreciated that in another embodiment, transceiver 108 may be integrated into external device 290.

In the Bluetooth embodiment, RF module 210 is a Bluetooth radio. The Bluetooth radio can provide: a bridge to existing data networks, a peripheral interface, and a mechanism to form piconets of connected devices away from fixed network infrastructures (see FIG. 1).

In the present embodiment, link controller 220 is a hardware digital signal processor for performing baseband processing as well as other functions such as Quality-of-Service, asynchronous transfers, synchronous transfers, audio coding, and encryption.

In one embodiment, microcontroller 230 is an application specific integrated circuit (ASIC). In the Bluetooth embodiment, microcontroller 230 is a separate central processing unit (CPU) core for managing transceiver 108 and for handling some inquiries and requests without having to involve the host device. In the Bluetooth embodiment, microcontroller 230 runs software that discovers and communicates with other Bluetooth devices via the Link Manager Protocol (LMP). The LMP provides a number of services including sending and receiving of data, inquiring of and reporting a name or device identifier, making and responding to link address inquiries, connection setup, authentication, and link mode negotiation and setup. The LMP also can be used to place transceiver 108 in "sniff" mode, "hold" mode, "park" mode or "standby" mode.

With reference still to FIG. 12, in the present embodiment, interface 240 is for coupling transceiver 108F to external device 290 via electrical connector 301 in a suitable format (e.g., USB, PCMCIA, PCI, CardBus, PC Card, etc.). In the present embodiment, interface 240 runs software that allows transceiver 108F to interface with the operating system of external device 290.

Figure 13:
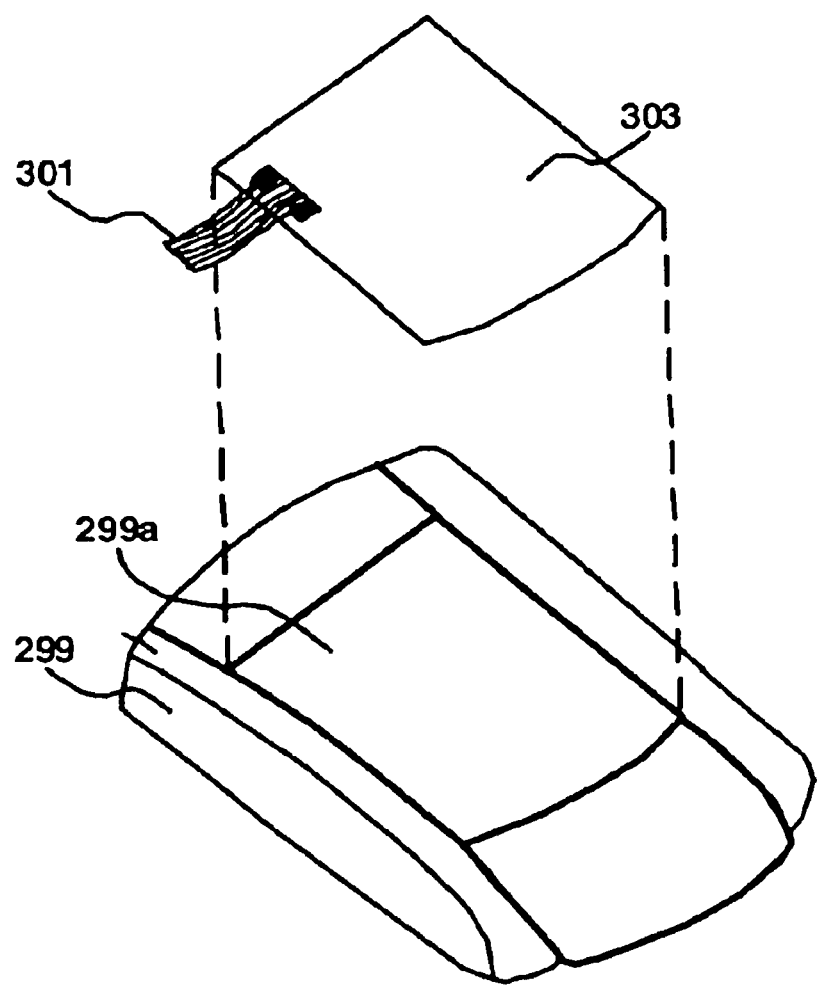
FIG. 13 is a front facing exploded perspective view of a portable electronic device configured with a passive radiating element disposed therein, in accordance with one embodiment of the present invention.

FIG. 13 is a front angled exploded perspective view of the passive radiator, of the present invention, coupled with a portable computer system having an antenna and being RF enabled, in one embodiment of the present invention. In this embodiment, passive radiator 303 is disposed within front cover 175, which is hingeably attached with palmtop computer system 100. It should be noted that the main body portion of palmtop computer system 100, as depicted in FIGS. 7, 8, and 9, is not shown so as to simplify the description of the exploded view of hinged front cover 175. It should be further noted that in another embodiment, passive radiator 303 may be disposed elsewhere within portable computer system 100, or within most other portable electronic devices. In yet another embodiment, passive radiator 303 may be disposed within a housing separate from the palmtop computer system, wherein the housing is adapted to be coupled to the palmtop computer system. In another embodiment, passive radiator 303 and the antenna of the portable computer system may be disposed within the housing.

Front cover 175 contains a front cover body portion 299 having a opening 299a. In one embodiment of the present invention, passive radiator 303 fits onto front cover body portion 299 and is supported within opening 299a. Passive radiator 303 is adapted to re-radiate energy received from the antenna of portable computer system 100, such that the radiation pattern becomes more omnidirectional and less multi-lobed. It should be appreciated that passive radiator 303 is comprised of a resonant conductive patch. In one embodiment of the present invention, the composition of passive radiator is metal. It should be further appreciated that a surface of passive radiator 303 should be exposed, either externally, or under a material, e.g., ABS plastic, that is transparent to radio signals, such that the radio signals are not blocked. Hence, the present invention's passive radiator is disposed on the outside of the electronic device (external relative to the device) thereby enhancing the function and performance of the antenna internal to the device.

Still in FIG. 13, flexible electrical connector 301 is coupled to passive radiator 303. Flexible electrical connector 301 is adapted to provide the communicative coupling between passive radiator 303 and PCB 225 of the main body portion of portable computer system 100, such that the passive radiator is communicatively coupled with the antenna of the portable computer system.

Moreover, the passive radiator that is outside of the device (external relative to the electronic device) enhances function and improves performance of the antenna internal to the electronic device.

It should be appreciated that by isolating the wireless transceiving components separate from electronics of the portable computer system, those previously discussed drawbacks have been overcome. By separating the wireless components from the portable computer system components, most of the electromagnetic interferences that are associated with coupling a transceiver with the PCB of a portable computer system have been eliminated. Further, the possible effects that the transceiver might have on the components of the portable computer system have been greatly reduced. In addition, by virtue of including a passive radiator, the radiation pattern is more of a omnidirectional pattern and less similar to the multi-lobed pattern normally associated with radiation patterns of previous simpler transceivers. Further, a passive radiator that is on the outside of the electronic device (external relative to the electronic device) enhances function and improves performance of an antenna internal to the electronic device.

It should be further appreciated that due to the tightly coupled system of the antenna, the PCB, and passive radiator, the wireless communication apparatus is less susceptible to being detuned by the introduction of nearby conductive bodies, e.g., the user's hand or the metal case of the portable computer system. Thus, even when the front cover is in the closed position, loss of antenna efficiency is so nominal as to be undetectable.

Thus, the present invention provides an apparatus and system for a passive radiator that is outside of the electronic device (external relative to the electronic device) for enhancing function and improving performance of an antenna internally disposed within a portable computer system to facilitate wireless communication. The present invention further provides an antenna which achieves the above listed accomplishment and which is invisible to a user. The present invention additionally provides an antenna which achieves the above listed accomplishments while requiring no user intervention. Additionally, the present invention provides an antenna that achieves the above listed accomplishments and that further provides maximum antenna performance while not interfering with the components and circuitry of the portable electronic device.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A wireless communication apparatus implementable in a portable electronic device, said wireless communication apparatus adapted to transceive information wirelessly, said wireless communication apparatus comprising:

a PCB (printed circuit board) communicatively coupled with said portable electronic device, said PCB in addition to said portable electronic device's PCB;

an antenna component, said antenna component coupled with said PCB of said wireless communication apparatus, said antenna configured to transceive a specific radio frequency band; and a passive radiator coupled with said PCB of said wireless communication apparatus, wherein said PCB of said wireless communication apparatus comprises a physical dimension, said physical dimension equivalent to an electrical half-wavelength of said specific radio frequency band, said physical dimension enabling said PCB to re-radiate some of the energy of said specific radio frequency band to said passive radiator, and wherein said passive radiator re-radiates said energy in an omnidirectional pattern so as to enhance the transceiving functionality of said wireless communication apparatus.

2. The wireless communication apparatus of claim 1 wherein said antenna is disposed upon said PCB of said wireless communication apparatus.

3. The wireless communication apparatus of claim 1 wherein electronics to enable wireless communication are disposed upon said PCB of said wireless communication apparatus.

4. The wireless communication apparatus of claim 1 wherein said antenna comprises a folded-element.

5. The wireless communication apparatus of claim 1 wherein said passive radiator is disposed proximal to said antenna, such that a surface of said passive radiator is exposed to radio signals and is disposed under a material that is transparent to said radio signals.

6. The wireless communication apparatus of claim 1 wherein said passive radiator comprises a resonant conductive patch.

7. The wireless communication apparatus of claim 6 wherein said resonant conductive patch is of a metallic composition.

8. A wireless communication system, adapted to provide wireless communication, said wireless communication system comprising:
- a portable electronic device;
- an additional PCB (printed circuit board) coupled with said portable electronic device, said additional PCB separate from a PCB of said portable electronic device;
- an antenna component coupled with said additional PCB, said antenna configured to transceive a specific radio frequency band; and
- a passive radiator coupled with said additional PCB, wherein said passive radiator, having received some of the energy of said specific radio frequency band re-radiated from said additional PCB, re-radiates said energy in an omnidirectional pattern so as to enhance the transceiving functionality of said wireless communication system.

9. The wireless communication system of claim 8 wherein said antenna is disposed upon said additional PCB.

10. The wireless communication system of claim 8 wherein upon said additional PCB is disposed in the electronics that enable said wireless communication.

11. The wireless communication system of claim 8 wherein said antenna comprises a folded element.

12. The wireless communication system of claim 8 wherein said additional PCB comprises a physical dimension, said physical dimension equivalent to an electrical half-wavelength of said specific radio frequency band, said physical dimension enabling said PCB to re-radiate some of the energy of said specific radio frequency band to said passive radiator.

13. The wireless communication system of claim 8 wherein said passive radiator is disposed proximal to said antenna, such that a surface of said passive radiator is exposed to a material that is transparent to radio signals.

14. The wireless communication system of claim 8 wherein said passive radiator comprises a resonant conductive patch.

15. The wireless communication system of claim 14 wherein the composition of said resonant conductive patch is a metallic material.

16. In a portable computer system having a hingeably attached front cover, an antenna structure comprising:
- a PCB (printed circuit board) communicatively coupled with said portable computer system, said PCB in addition to said portable computer system's PCB;
- an antenna component, said antenna component coupled with said PCB of said portable computer system, said antenna component configured to transceive a specific radio frequency band; and
- a passive radiator coupled with said PCB of said portable computer system, wherein said passive radiator, having received some of the energy of said specific radio frequency band re-radiated from said PCB of said portable computer system, re-radiates said energy in an omnidirectional pattern so as to enhance the transceiving functionality of said antenna structure.

17. A passive radiator adapted to be coupled with a portable electronic device, said portable electronic device having an antenna coupled thereto, said passive radiator comprising;
- a resonant conductive patch, said resonant conductive patch is of a metallic composition;
- said passive radiator further adapted to be communicatively coupled with said antenna coupled to said portable electronic device;
- said passive radiator disposed external to said portable electronic device such that said passive radiator enhances function and improves performance of said antenna coupled to said portable electronic device, wherein said passive radiator, having received some of the energy of a specific radio frequency band re-radiated from said antenna, re-radiates said energy in an omnidirectional pattern.

18. The passive radiator of claim 17 wherein said passive radiator is disposed in a housing, said housing separate from said portable electronic device, said housing adapted to be coupled with said portable electronic device.

19. The passive radiator of claim 17 wherein said passive radiator and said antenna of said portable electronic device are disposed in a housing, said housing separate from said portable electronic device, said housing adapted to be coupled with said portable electronic device.

* * * * *